US010242524B2

(12) United States Patent
Ansari

(10) Patent No.: US 10,242,524 B2
(45) Date of Patent: *Mar. 26, 2019

(54) REAL THREE DIMENSIONAL DISPLAY FOR WAGERING GAME MACHINE EVENTS

(71) Applicant: Bally Gaming, Inc., Las Vegas, NV (US)

(72) Inventor: Marwan Ansari, Plainfield, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/495,300

(22) Filed: Apr. 24, 2017

(65) Prior Publication Data
US 2017/0287260 A1 Oct. 5, 2017

Related U.S. Application Data

(63) Continuation of application No. 12/742,068, filed as application No. PCT/US2008/012605 on Nov. 7, 2008, now Pat. No. 9,640,021.

(60) Provisional application No. 60/986,705, filed on Nov. 9, 2007.

(51) Int. Cl.
*A63F 13/00* (2014.01)
*G07F 17/32* (2006.01)
*G06T 15/00* (2011.01)
*G06T 17/00* (2006.01)

(52) U.S. Cl.
CPC .......... *G07F 17/3211* (2013.01); *G06T 15/00* (2013.01); *G06T 17/00* (2013.01); *G07F 17/32* (2013.01); *A63F 2250/30* (2013.01)

(58) Field of Classification Search
CPC ... H04N 2213/008; G06T 15/00; G06T 17/00; G02B 27/0172; G02B 2027/0127; G09G 2354/00; G09G 5/14; G09G 5/30; A63F 13/00; A63F 9/24
See application file for complete search history.

(56) References Cited

U.S. PATENT DOCUMENTS

| 6,267,669 B1 | 7/2001 | Luciano, Jr. et al. |
| 6,666,766 B2 | 12/2003 | Baerlocher et al. |
| 6,811,482 B2 | 11/2004 | Letovsky |
| 6,866,585 B2 | 3/2005 | Muir |
| 6,887,157 B2 | 5/2005 | LeMay et al. |
| 7,112,133 B2 | 9/2006 | Lyons |
| 7,128,647 B2 | 10/2006 | Muir |

(Continued)

FOREIGN PATENT DOCUMENTS

| JP | 2004-255064 | 9/2004 |
| JP | 2007-240559 | 9/2007 |

(Continued)

OTHER PUBLICATIONS

"A Display: Philips WOWvx 3d Displays: Casinos First to Use"; VRoot.org; Aug. 15, 2006, retrieved on Jan. 7, 2009 from http://vroot.org/node/747 (2 pages).

(Continued)

*Primary Examiner* — Justin L Myhr
(74) *Attorney, Agent, or Firm* — Nixon Peabody LLP

(57) ABSTRACT

Systems and methods include a wagering game machine having a three-dimensional monitor. Certain events are 3D transition events that cause certain graphical elements presented by the wagering game to be rendered as real 3D objects using the three-dimensional monitor.

11 Claims, 6 Drawing Sheets

(56) References Cited

U.S. PATENT DOCUMENTS

| | | |
|---|---|---|
| 7,169,044 B2 | 1/2007 | Baerlocher et al. |
| 2002/0119815 A1 | 8/2002 | Lyons |
| 2003/0069066 A1 | 4/2003 | Seelig et al. |
| 2004/0002380 A1 | 1/2004 | Brosnan et al. |
| 2004/0029636 A1 | 2/2004 | Wells |
| 2004/0053686 A1 | 3/2004 | Pacey et al. |
| 2004/0061698 A1 | 4/2004 | Seigneret |
| 2004/0077401 A1 | 4/2004 | Schlottmann |
| 2004/0077402 A1 | 4/2004 | Schlottmann |
| 2004/0077404 A1 | 4/2004 | Schlottmann et al. |
| 2004/0102244 A1 | 5/2004 | Kryuchkov et al. |
| 2004/0102245 A1 | 5/2004 | Escalera et al. |
| 2004/0192430 A1 | 9/2004 | Burak et al. |
| 2004/0266536 A1 | 12/2004 | Mattice et al. |
| 2005/0037843 A1 | 2/2005 | Wells et al. |
| 2005/0059487 A1 | 3/2005 | Wilder et al. |
| 2005/0075167 A1 | 4/2005 | Beaulieu et al. |
| 2005/0128204 A1 | 6/2005 | Ohmori |
| 2005/0215319 A1 | 9/2005 | Rigopulos et al. |
| 2005/0233799 A1 | 10/2005 | LeMay et al. |
| 2005/0255908 A1 | 11/2005 | Wells |
| 2006/0009285 A1 | 1/2006 | Pryzby et al. |
| 2006/0052152 A1 | 3/2006 | Tedsen et al. |
| 2006/0058100 A1 | 3/2006 | Pacey et al. |
| 2006/0068900 A1 | 3/2006 | Englman |
| 2006/0139448 A1 | 6/2006 | Ha et al. |
| 2007/0173307 A1 | 7/2007 | Aida |
| 2007/0202949 A1 | 8/2007 | Kawade |
| 2008/0309660 A1 | 12/2008 | Bertolami et al. |

FOREIGN PATENT DOCUMENTS

| | | |
|---|---|---|
| JP | 2008-295511 | 12/2008 |
| WO | 2004028650 A1 | 4/2004 |
| WO | 2004029893 A1 | 4/2004 |
| WO | WO 04/028650 | 4/2004 |
| WO | WO 04/029893 | 4/2004 |
| WO | 2006039257 A1 | 4/2006 |
| WO | 2006039348 A1 | 4/2006 |
| WO | 2006039371 A2 | 4/2006 |
| WO | WO 2006/039257 | 4/2006 |
| WO | WO 2006/039348 | 4/2006 |
| WO | WO 2006/039371 | 4/2006 |

OTHER PUBLICATIONS

International Preliminary Report on Patentability for PCT/US2008/012605 dated Feb. 25, 2010 (8 pages).

International Search Report and Written Opinion of International Searching Authority for PCT/US2008/012605 dated Feb. 17, 2009 (7 pages).

"Philips 3D Solutions: Technology Backgrounder: WOWvx for amazing viewing experience"; Koninklijke Philips Electronics N.V., May 2006, retrieved on Jan. 7, 2009 from http://www.infoterminals.eu/datasheet/philips_3d.pdf (4 pages).

REAL THREE DIMENSIONAL DISPLAY FOR WAGERING GAME MACHINE EVENTS

REFERENCE TO RELATED APPLICATIONS

This application is a continuation of U.S. patent application Ser. No. 12/742,068, filed May 7, 2010, and titled "Real Three Dimensional Display For Wagering Game Machine Events," now allowed, which is a U.S. National Stage filing under 35 U.S.C. 371 from International Patent Application No. PCT/US2008/012605, filed Nov. 7, 2008, and titled "Real Three Dimensional Display For Wagering Game Machine Events," which claims the priority benefit of U.S. Provisional Patent Application Ser. No. 60/986,705, filed Nov. 9, 2007, and titled "Real Three Dimensional Display For Wagering Game Machine Events," each of which is incorporated herein by reference in its entirety.

FIELD

The embodiments relate generally to wagering game machines and more particularly to providing a real three dimensional display of graphical objects in response to wagering game events.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright © 2007, 2008, WMS Gaming Inc. All Rights Reserved.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience

BRIEF SUMMARY

According to one aspect of the present disclosure, a gaming system includes a gaming machine and having a three-dimensional (3D) display device capable of presenting a graphical object of a wagering game in a flat three-dimensional form and in a real three-dimensional form. In the real 3D form, the graphical object appears to a player to be in front of or behind a screen of the display device. The gaming system further has a hardware platform operative with software to present the graphical object of the wagering game on the display device, the software including a graphical subsystem having a standard graphics library and a real 3D graphics library. The software makes a plurality of function calls when executed on the gaming machine, the plurality of function calls including a standard function call invoking a standard function in the standard graphics library and a real 3D function call invoking a real 3D function in the real 3D graphics library. The real 3D function determines whether the graphical object appears in front of or behind the screen of the display device and a depth of the graphical object relative to the screen.

According to another aspect of the present disclosure, a gaming machine includes a three-dimensional (3D) display device capable of presenting a graphical object of a wagering game in a flat three-dimensional form and in a real three-dimensional form. In the real 3D form, the graphical object appears to a player to be in front of or behind a screen of the display device. The gaming machine further includes a hardware platform operative with software to present the graphical object of the wagering game on the display device, the software including a graphical subsystem having a standard graphics library and a real 3D graphics library. The software makes a plurality of function calls when executed on the gaming machine, the plurality of function calls including a standard function call invoking a standard function in the standard graphics library and a real 3D function call invoking a real 3D function in the real 3D graphics library. The real 3D function determines whether the graphical object appears in front of or behind the screen of the display device and a depth of the graphical object relative to the screen.

According to yet another aspect of the present disclosure, a method includes accepting, via a value input device, a physical item associated with a monetary value to fund a wager for playing a wagering game, and rendering, by a rendering engine, a three-dimensional (3D) game world for a wagering game on a 3D display device. The method also includes generating, by a processor, a random event in the wagering game and representing the random event with at least one graphical object in the 3D game world, and, in response to a software flag indicating that the graphical object is to be rendered in a flat 3D form, making a standard computer function call into a standard graphics library and rendering the graphical object in real time in the flat 3D form in the 3D game world. In response to the software flag indicating that the graphical object is to be rendered in the real 3D form, the method further includes making a real 3D computer function call into a real 3D graphics library to determine a depth of the graphical object relative to the screen of the display device and whether the graphical object appears in front of or behind the screen and rendering the graphical object in real time in the real 3D form in the 3D game world. Further yet, the method includes providing, by the processor, an award for a winning outcome of the random event.

DETAILED DESCRIPTION

Figure 1:
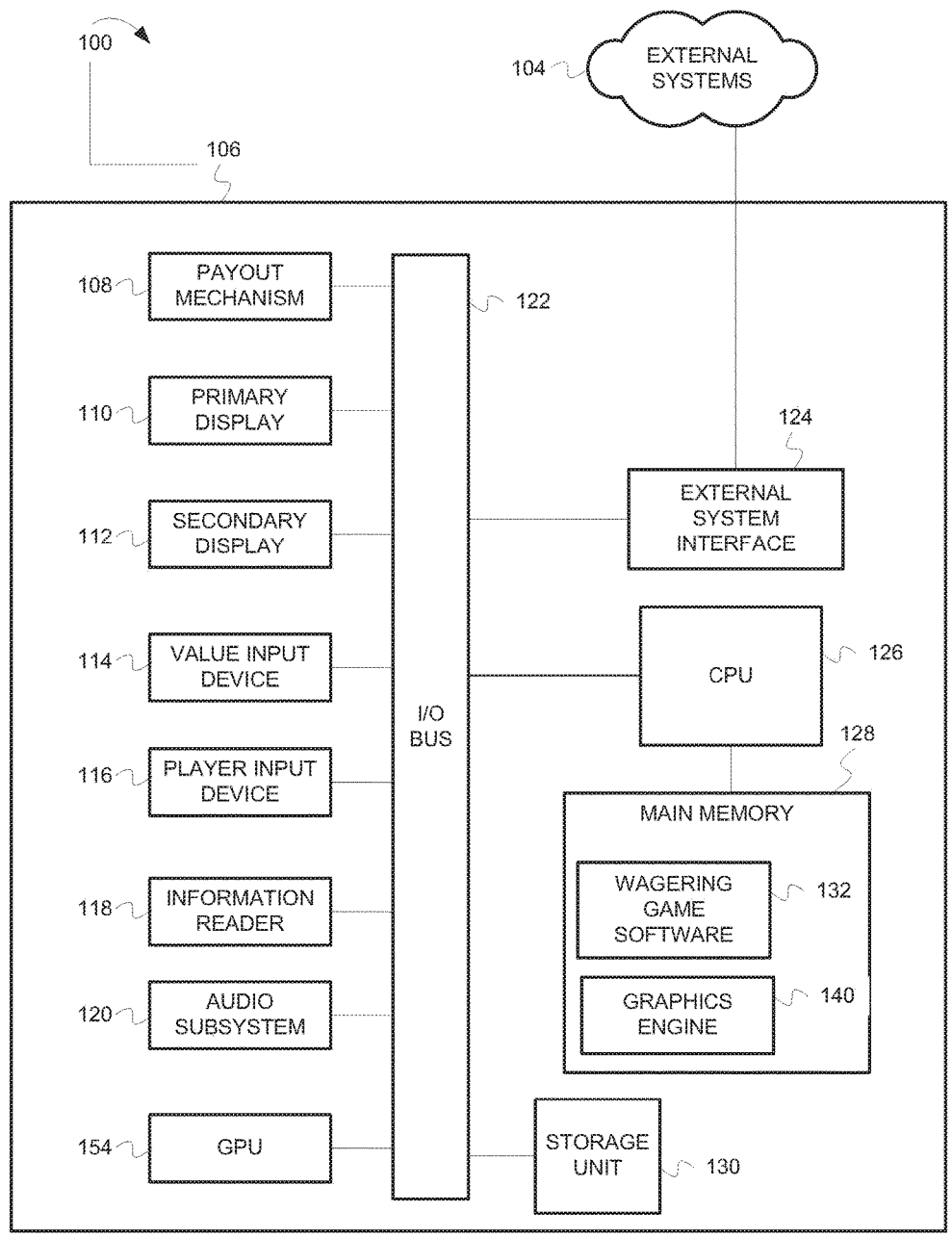
FIG. 1 is a block diagram of an architecture, including a control system, for a wagering game machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

In general, the system and method embodiments described below provide for the presentation of a wagering game on a wagering game machine where various portions, or various graphical objects or elements within the wagering game, may be presented at different rates of motion through time. Further embodiments provide for replaying a portion of a wagering game from a previous point in time of the presentation of the wagering game. These time control aspects of a wagering may provide for increased excitement and anticipation, provide opportunities for providing input (and thus the sense of more control) and provide opportunities to see details that would not be possible if a standard rate of motion through time were used.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 is a block diagram illustrating a wagering game machine architecture 100, including a control system, according to example embodiments of the invention. As shown in FIG. 1, the wagering game machine 106 includes a central processing unit (processor) 126 connected to main memory 128, which may store wagering game software 132. In one embodiment, the wagering game software can include software associated with presenting wagering games, such as video poker, video black jack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The processor 126 is also connected to an input/output (I/O) bus 122, which facilitates communication between the wagering game machine's components. The I/O bus 122 may be connected to a payout mechanism 108, graphics processing unit 154, primary display 110, secondary display 112, value input device 114, player input device 116, information reader 118, and/or storage unit 130. The player input device 116 can include the value input device 114 to the extent the player input device 116 is used to place wagers. The I/O bus 122 may also be connected to an external system interface 124, which is connected to external systems 104 (e.g., wagering game networks).

Primary display 110 and/or secondary display 112 may be a three-dimensional (3D) display device. That is, display 110 or display 112 may be capable of presenting an image such that objects in the image appear to the player as having a real three-dimensional form that appears to "pop out" of the display device. In other words, the graphical object appears to cross over from the flat 3D space created by the wagering game such that the object appears to take up space in the physical world, either in front of or behind the display device. For the purposes of this specification, the term "real 3D" will be used to refer to such images, while the term "flat 3D" will be used to refer to images that are rendered and presented having a three dimensional perspective. Flat 3D is thus a three dimensional projection onto the flat surface of a two dimensional screen of a display device. In some embodiments, either or both of primary display 110 and secondary display 112 may be a WOWvx display available from Koninklijke Philips Electronics N.V. However, the embodiments are not limited to a particular 3D display and other such 3D displays are available and within the scope of the inventive subject matter.

In general, graphics processing unit 154 processes three-dimensional graphics data and may be included as part of primary display 110 and/or secondary display 112. Graphics processing unit 154 includes components that may be used to provide a real-time three-dimensional rendering of a three-dimensional space based on input data. Graphics processing unit 154 may be implemented in software, hardware, or a combination of software and hardware.

In some embodiments, graphics processing unit 154 provides a set of one or more components that provide real-time three dimensional computer graphics for a wagering game application or other software running on a wagering game machine. Graphics processing unit 154 may also be referred to as a game engine. In some embodiments, graphics processing unit 154 provides an underlying set of technologies in an operating system independent manner such that a wagering game may be easily adapted to run on multiple platforms, including various hardware platforms such as stand-alone and portable wagering game machines and various software platforms such as Linux, UNLX, Mac OS X and Microsoft Windows families of operating systems. In some embodiments, graphics processing unit 154 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described, above may be implemented in various combinations of software, hardware and/or firmware. Further, while shown as part of a control system 100 for a wagering game machine, graphics processing unit 154 or portions thereof may reside on systems external to the wagering game machine, such as on a game server.

In some embodiments, the components of graphics processing unit 154 may be replaced or extended with more specialized components. For example, in particular embodiments, graphics processing unit 154 may be provided as a series of loosely connected components that can be selectively combined to create a custom graphics engine for a wagering game application.

As noted above, various components may be present or associated with a graphics processing unit 154. For example, a graphics engine 140 may be provided for use with graphics processing unit 154. Various graphics engines are known in the art and may be used in various embodiments of the invention. In some embodiments, the graphics engine comprises a RenderWare graphics engine, available from Criterion Software. Some graphics engines 140 provide real-time 3D rendering capabilities while other components outside of the graphics engine provide other functionality used by wagering games. These types of graphics engines 140 may be referred to as a "rendering engine," or "3D engine".

In some embodiments, the graphics processing unit 154 and/or graphics engine 140 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

Figure 3:
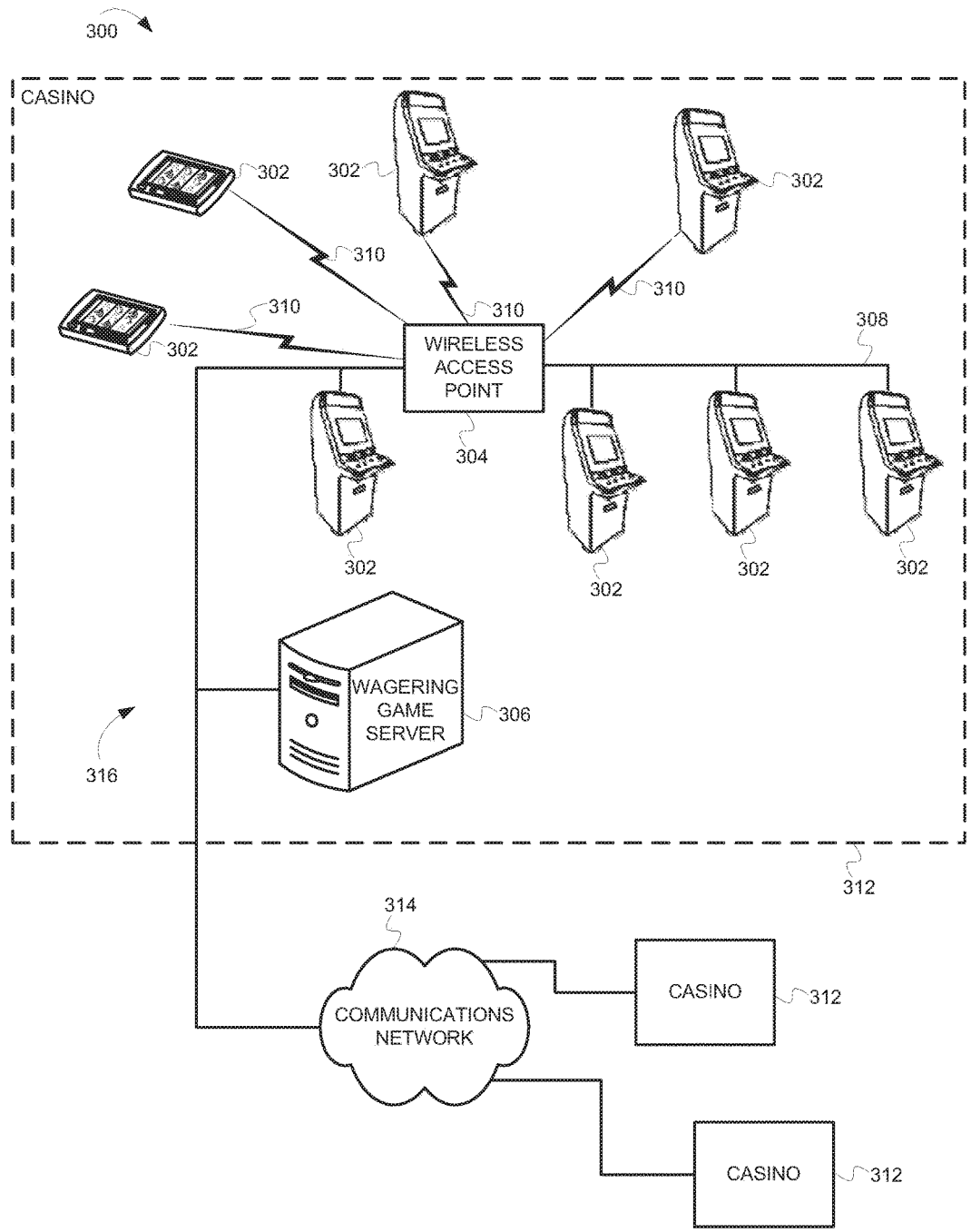
FIG. 3 is a block diagram of a networked system of wagering game machines and servers according to example embodiments.

Wagering game software 132 may be loaded from storage unit 130, or it may be loaded from external systems 104 such as servers of other systems on a wagering game network (as illustrated in FIG. 3). In general, wagering game software 132 comprises modules or units that operate to present one or more wagering game upon which monetary value may be wagered. During the course of presenting the wagering games, images composed of graphical objects are displayed on primary display 110 and/or secondary display 112. The graphical objects may represent various wagering game elements such as reels, cards, dice, symbols, animations, etc., and may also represent elements of a bonus round or other ancillary wagering game software component. The graphical objects may include one or more particle arrays arranged in one or more matrices.

Some embodiments of the invention include an audio subsystem 120. Audio subsystem 120 provides audio capabilities to the wagering game machine and may comprise an audio amplifier coupled to speakers or an audio jack, and may further include an audio programming source on a memory such as a CD, DVD, flash memory etc.

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple processors 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine architecture 100 (e.g., the wagering game presentation unit 132 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 114 or devices coupled through player input device 116, the player may select any variables associated with the wagering game and place his/her wager to purchase a play of the game. In a play of the game, the processor 126 generates at least one random event using a random number generator (RING) and provides an award to the player for a winning outcome of the random event. Alternatively, the random event may be generated by a remote computer using an RNG or pooling schema and then transmitted to the wagering game machine. The processor 126 operates the display 110 or 112 to represent the random event(s) and outcome(s) in a visual form that can be understood by the player. In some embodiments, a wagering game segment may be triggered based on certain events. For example, a bonus round may be triggered.

Figure 2:
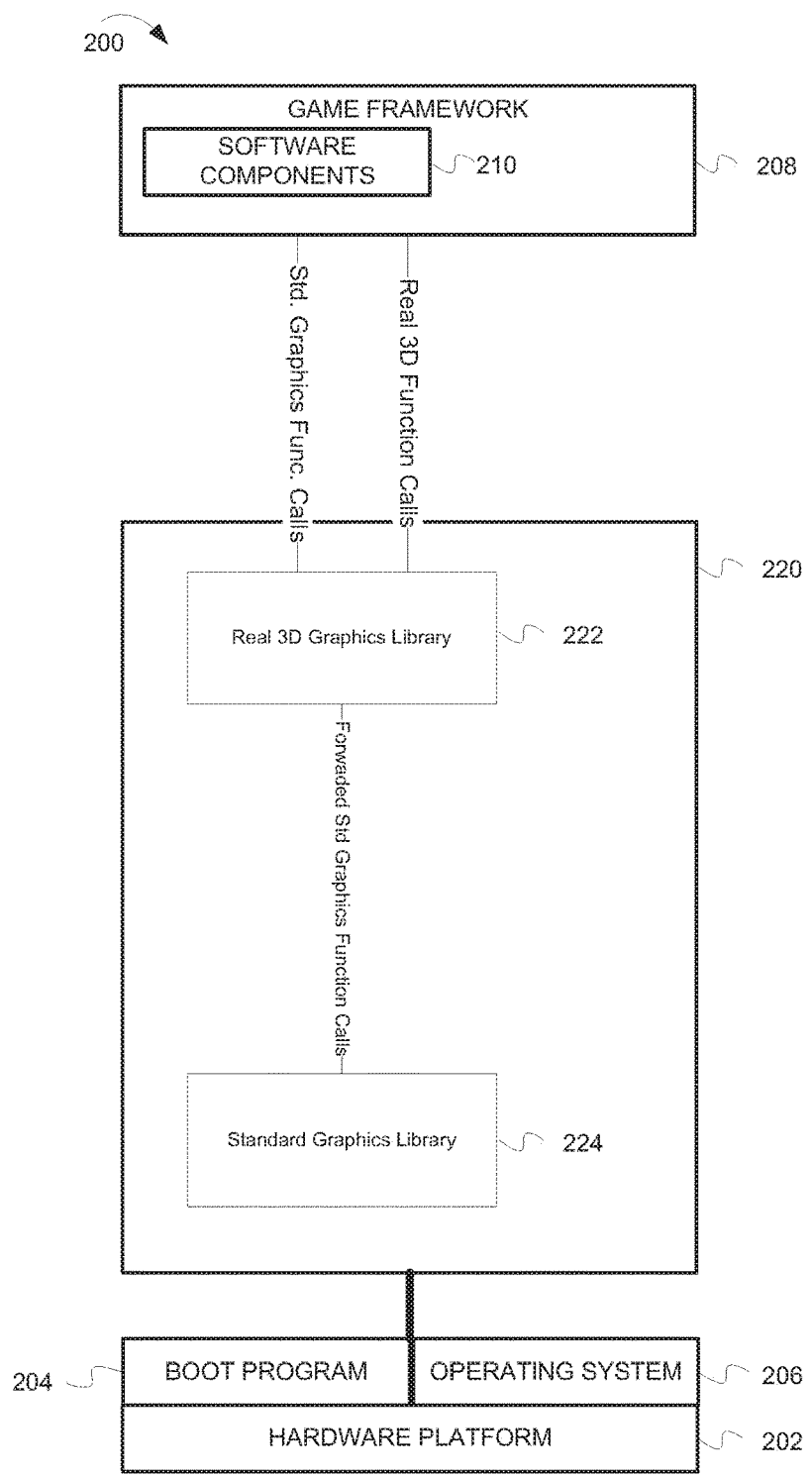
FIG. 2 is a block diagram of a software architecture for a wagering game machine according to an example embodiment.

FIG. 2 is a block diagram of a software architecture 200 for a wagering game machine according to an example embodiment. As shown in FIG. 2, the wagering game architecture includes a hardware platform 202, a boot program 204, an operating system 206, a game framework 208 that includes one or more wagering game software components 210 and a graphics subsystem 220. In various embodiments, the hardware platform 202 may include a thin-client, thick-client, or some intermediate derivation. The hardware platform 202 may also be configured to provide a virtual client. The boot program 204 may include a basic input/output system (BIOS) or other initialization program that works in conjunction with the operating system 206 to provide a software interface to the hardware platform 202. The game framework 208 may include standardized game software components either independent or in combination with specialized or customized game software components that are designed for a particular wagering game. In one example embodiment, the wagering game software components 210 may include software operative in connection with the hardware platform 202 and operating system 206 to present wagering games, such as video poker, video black jack, video slots, video lottery, etc., in whole or part. According to another example embodiment, the software components 210 may include software operative to accept a wager from a player. According to another example embodiment, one or more of the software components 210 may be provided as part of the operating system 206 or other software used in the wagering game system 200 (e.g., libraries, daemons, common services, etc.).

Graphical subsystem 220 may provide one or more libraries of graphical functions that may be used by the wagering game system to display wagering games, bonus games, attract mode content, wagering game portal content, advertising or any other images to be displayed on a primary or secondary display of a wagering game machine. In some embodiments, graphical subsystem 220 may include a standard graphics library 224 and a real 3D graphics library 222. Standard graphics library 224 may be an OpenGL graphics library, and real 3D graphics library 222 may be the WOWvx OpenGL Control library available from Koninklijke Philips Electronics N.V.

During the operation of wagering game machine 100, graphical images are generated and displayed to the user. Function calls, including both standard and real 3D function calls, are made by software executing on wagering game machine 100 and invoke functions in real 3D graphics library 222. Standard function calls may be forwarded to functions in standard graphics library 224, while real 3D function calls are processed, at least in part, by functions in real graphics library 222. In some embodiments, functions in real graphics library 222 provide the ability to define how real 3D images are presented. For example, functions in real graphics library 222 provide the ability to set parameters controlling how much depth is displayed, whether three dimensional objects appear in front or behind the physical screen (or both in front and behind), horizontal and vertical edges of the real 3D display, and the Z buffer values of the closest and farthest pixels of interest.

In some embodiments, graphical objects may be defined as polygons. The graphical objects may have a flag associated with the graphical object where the state of the flag determines whether or not the graphical object is rendered in real 3D or as a flat 3D object. If the flag value indicates that the objects is to be displayed as a real 3D object, function calls into the real 3D graphics library may be invoked to establish Z values for the graphical object and to set other real 3D display parameters.

While FIGS. 1 and 2 describe example embodiments of a wagering game machine hardware and software architecture, FIG. 3 shows how a plurality of wagering game machines can be connected in a wagering game network.

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 304 and the wagering game machines 302 can communicate in accordance with a short-range wireless standard, such as the Bluetooth™ short-range digital communication protocol.

It will be appreciated from the above that various components of a wagering game architecture and/or their functionality may be distributed in various manners. For example, all of the components and functionality may reside in a wagering game machine, or various portions may reside in part on a wagering game machine and in part on a server or other network attached device. The scope of the inventive subject matter is meant to include all of these environments.

Figure 4:
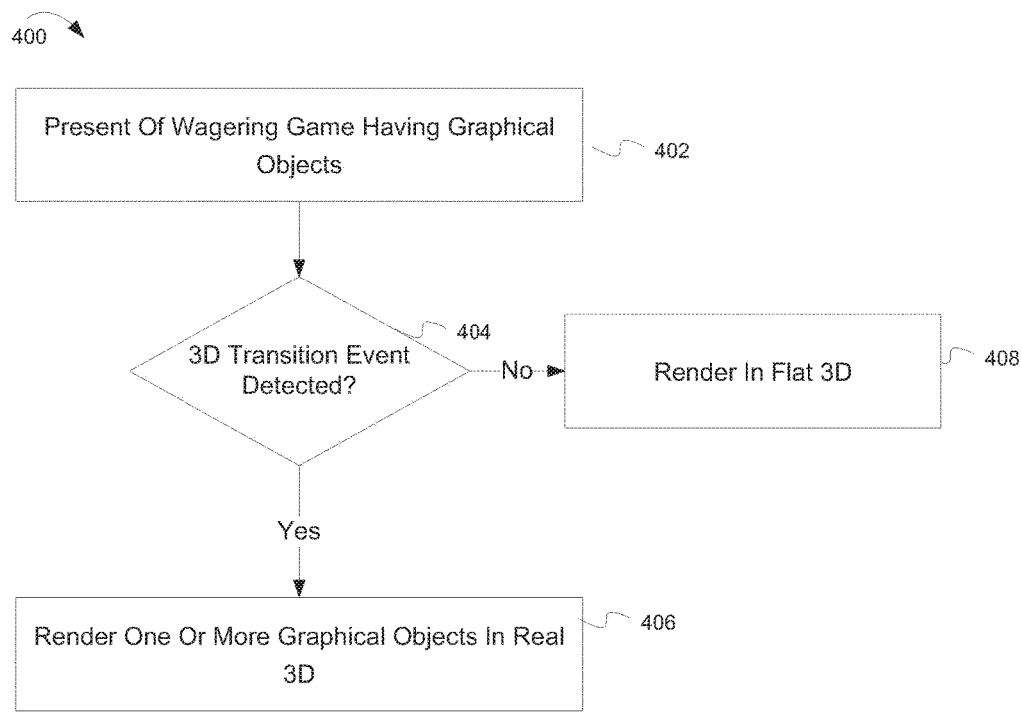
FIG. 4 is a flowchart illustrating methods for providing time control aspects in a wagering game according to example embodiments.

FIG. 4 is a flowchart illustrating a method 400 for rendering a display in a wagering game using a particle array according to example embodiments. The methods to be performed by an operating environment such as control system 100 and network system 300 constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 4 are inclusive of acts that may be taken by an operating environment executing an exemplary embodiment of the invention.

In some embodiments, method 400 begins at block 402 by initiating the presentation of a wagering game upon which monetary value may be wagered. The wagering game may be any type of wagering game such as video versions of a slots, poker, keno, bingo, pachinko, craps or any other type of wagering game. The wagering game has graphical objects that define elements of the display for the wagering game. For example, graphical objects may be used to define and render reels, symbols, tokens, characters, text, fields, backgrounds or any other object that is displayed as part of a wagering game, bonus game, attract mode, idle mode, portal display or other display aspect of a wagering game.

At block 404, the system determines whether a 3D transition event has occurred. If a 3D transition event has occurred, then at block 406 the system proceeds to render one more graphical objects in real three dimensional form by calling real 3D library functions to cause information to be sent to a real 3D monitor to enable the display of the objects in real 3D. In some embodiments, the transition from 2D or flat 3D to real 3D display uses linear interpretation of the Z values such that the graphical objects that are rendered in real 3D appear to gradually pop out of the display. The rate at which the object appear to gradually pop out of the display may be specified by the game designer. Alternatively, the graphical objects may be rendered to immediately appear at their respective Z positions in front or behind the display screen.

Otherwise, if no 3D transition events have occurred, then at block 408 the system renders graphical objects and displays them as either 2D or flat 3D objects on the display. It should be noted that the sequence of events may start at block 408 and proceed back to block 402. In this situation, a wagering game or elements of a wagering game are presented in real 3D. In response to an event, the real 3D display ceases, and a 2D or flat 3D display resumes.

Various types of 3D transition events are possible, and individual 3D transition events may be handled in different ways. Details on such 3D transition events and the handling of such events will now be described.

A reel spin 3D transition event may cause one or more reels of a video slots wagering game to be rendered and displayed on a 3D monitor such that the reels appear to be true three dimensional reels that appear to pop out of the display, that is, the reels appear to cross over from the flat 3D space created by the wagering game such that the reels appear to take up space in the physical world. Individual reels of groups of reels within a set of reels may be rendered in different ways. For example, some reels may be rendered as 2D or flat 3D reels while other reels may be rendered in as real 3D reels. Alternatively, the reels may be rendered as flat 3D reels while an individual symbol on the reel may be rendered in real 3D so as to appear to pop out of the display. Further, one or more paylines may be rendered in real 3D such that the payline appears to hover over the display.

A wild symbol or bonus symbol 3D transition event may cause the wild symbol or bonus symbol to be rendered in real 3D such that the symbol appears to pop out of the display. Further, the symbol may be rendered such that in appears to both expand and pop out of the display, that is the symbol appears to cross over from the flat 3D space created by the wagering game such that the symbol appears to take up space in the physical world.

A bonus game 3D transition event may cause the system to display a transition from a base game to a bonus game, or vice versa, in real 3D. In some embodiments, the transition is made to appear as if a page is turning from the base game to the bonus game. As the page turns, it appears to pop out of the display towards the user. In other embodiments, the base game may be rendered in 2D or flat 3D, while the bonus game is rendered in real 3D.

A pick object 3D transition event may cause the system to render pickable graphical objects so that they appear as real 3D objects that pop out of the display thereby appearing to cross over from the flat 3D space created by the wagering game such that the pickable objects appear to take up space in the physical world. For example, in many bonus games, a player may select a graphical element such as a treasure chest, a jewel, a balloon, or other graphical element to reveal a bonus credit amount associated with the element. The pickable elements may be rendered in real 3D while non-pickable elements may be rendered in 2D or flat 3D. Alternatively, the pickable elements may be rendered in 2D or flat 3D and the bonus amount revealed upon selection of the pickable element may be rendered in real 3D so as to appear to pop out of the display.

A game element 3D transition event may cause the system to render a base game or bonus game in real 3D when the game element appears. For example, in a "Dirty Harry" themed bonus game, the appearance of an armored car that a player may chase in the bonus game may trigger the rendering of the bonus game in real 3D.

A meter transition event may cause the system to display credit meters in a real 3D format. For example, the text associated with the credit meter data may appears to pop out of the display. Similarly, a pay table transition event may cause text for a pay table to be rendered in real 3D so as to appear to pop out of the display.

It should be noted that the order of execution of the tasks described above with respect to FIG. 4 may be executed in an order different from that described above.

Example Wagering Game Machine

Figure 5:
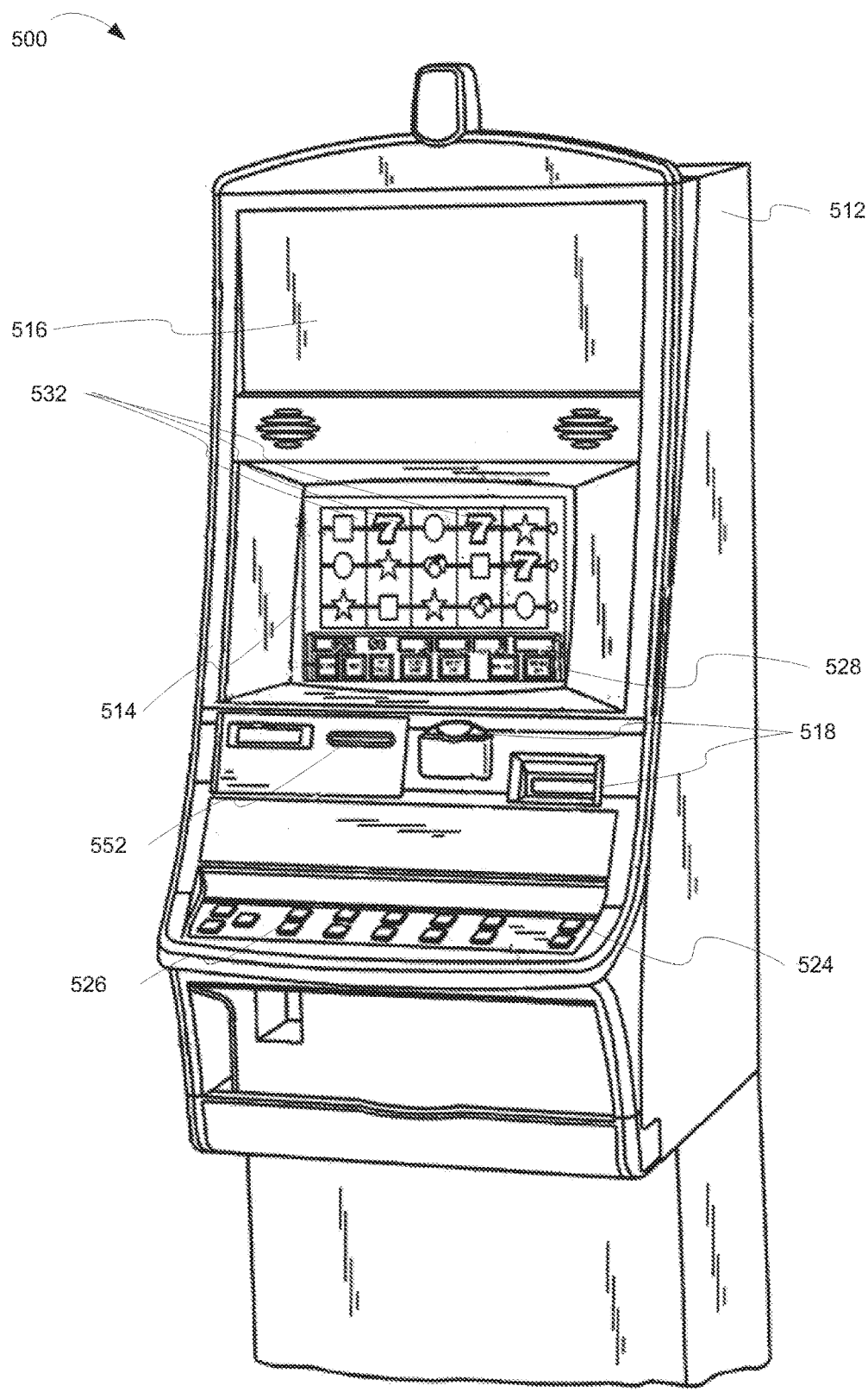
FIG. 5 is a perspective view of a wagering game machine, according to example embodiments of the invention.

FIG. 5 is a perspective view of a wagering game machine, according to example embodiments of the invention. Referring to FIG. 5, a wagering game machine 500 is used in gaming establishments, such as casinos. According to embodiments, the wagering game machine 500 can be any type of wagering game machine and can have varying structures and methods of operation. For example, the wagering game machine 500 can be an electromechanical wagering game machine configured to play mechanical slots, or it can be an electronic wagering game machine configured to play video casino games, such as blackjack, slots, keno, poker, blackjack, roulette, etc.

The wagering game machine 500 comprises a housing 512 and includes input devices, including value input devices 518 and a player input device 524. For output, the wagering game machine 500 includes a primary display 514 for displaying information about a basic wagering game. The primary display 514 can also display information about a bonus wagering game and a progressive wagering game. The wagering game machine 500 also includes a secondary display 516 for displaying wagering game events, wagering game outcomes, and/or signage information. Either or both of displays 514 and 516 may be a real 3D display having the capability to present real 3D images in addition to or instead of 2D or flat 3D images. While some components of the wagering game machine 500 are described herein, numerous other elements can exist and can be used in any number or combination to create varying forms of the wagering game machine 500.

The value input devices 518 can take any suitable form and can be located on the front of the housing 512. The value input devices 518 can receive currency and/or credits inserted by a player. The value input devices 518 can include coin acceptors for receiving coin currency and bill acceptors for receiving paper currency. Furthermore, the value input devices 518 can include ticket readers or barcode scanners for reading information stored on vouchers, cards, or other tangible portable storage devices. The vouchers or cards can authorize access to central accounts, which can transfer money to the wagering game machine 500.

The player input device 524 comprises a plurality of push buttons on a button panel 526 for operating the wagering game machine 500. In addition, or alternatively, the player input device 524 can comprise a touch screen 528 mounted over the primary display 514 and/or secondary display 516.

The various components of the wagering game machine 500 can be connected directly to, or contained within, the housing 512. Alternatively, some of the wagering game machine's components can be located outside of the housing 512, while being communicatively coupled with the wagering game machine 500 using any suitable wired or wireless communication technology.

The operation of the basic wagering game can be displayed to the player on the primary display 514. The primary display 514 can also display a bonus game associated with the basic wagering game. The primary display 514 can include a cathode ray tube (CRT), a high resolution liquid crystal display (LCD), a plasma display, light emitting diodes (LEDs), or any other type of display suitable for use in the wagering game machine 500. Alternatively, the primary display 514 can include a number of mechanical reels to display the outcome. In FIG. 5, the wagering game machine 500 is an "upright" version in which the primary display 514 is oriented vertically relative to the player. Alternatively, the wagering game machine can be a "slant-top" version in which the primary display 514 is slanted at about a thirty-degree angle toward the player of the wagering game machine 500. In yet another embodiment, the wagering game machine 500 can exhibit any suitable form factor, such as a free standing model, bartop model, mobile handheld model, or workstation console model. Further, in some embodiments, the wagering game machine 500 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 518. The player can initiate play by using the player input device's buttons or touch screen 528. The basic game can include arranging a plurality of symbols along a payline 532, which indicates one or more outcomes of the basic game. Such outcomes can be randomly selected in response to player input. At least one of the outcomes, which can include any variation or combination of symbols, can trigger a bonus game.

In some embodiments, the wagering game machine 500 can also include an information reader 552, which can include a card reader, ticket reader, bar code scanner, MD transceiver, or computer readable storage medium interface.

In some embodiments, the information reader 552 can be used to award complimentary services, restore game assets, track player habits, etc.

Example Portable Wagering Game Machine

Figure 6:
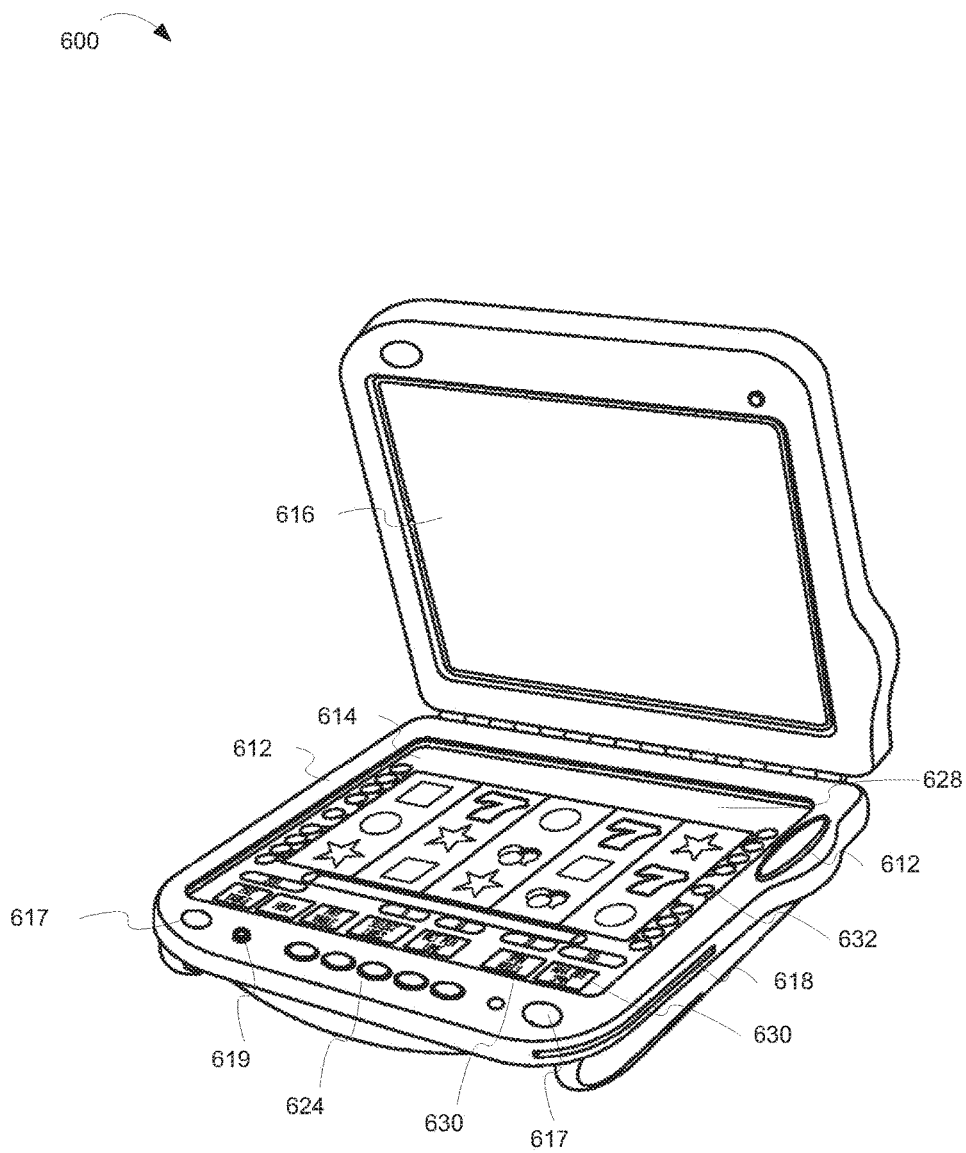
FIG. 6 is a perspective view of a portable wagering game machine according to an example embodiment.

FIG. 6 shows an example embodiment of a portable wagering game machine 600. The portable wagering game machine 600 can include any suitable electronic handheld or mobile device configured to play a video casino game such as blackjack, slots, keno, poker, blackjack, and roulette. The wagering game machine 600 comprises a housing 612 and includes input devices, including a value input device 618 and a player input device 624. For output, the wagering game machine 600 includes a primary display 614, and may include a secondary display 616, one or more speakers 617, one or more player-accessible ports 619 (e.g., an audio output jack for headphones, a video headset jack, etc.), and other conventional I/O devices and ports, which may or may not be player-accessible. In the embodiment depicted in FIG. 6, the wagering game machine 600 includes a secondary display 616 that is rotatable relative to the primary display 614. The optional secondary display 616 can be fixed, movable, and/or detachable/attachable relative to the primary display 614. Either the primary display 614 and/or secondary display 616 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 618 can comprise, for example, a slot located on the front, side, or top of the casing 612 configured to receive credit from a stored-value card (e.g., casino card, smart card, debit card, credit card, etc.) inserted by a player. The player-accessible value input device 618 can also comprise a sensor (e.g., an RF sensor) configured to sense a signal (e.g., an RF signal) output by a transmitter (e.g., an RF transmitter) carried by a player. The player-accessible value input device 618 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 600.

Still other player-accessible value input devices 618 can require the use of touch keys 630 on the touch-screen display (e.g., primary display 614 and/or secondary display 616) or player input devices 624. Upon entry of player identification information and, preferably, secondary authorization information (e.g., a password, PIN number, stored value card number, predefined key sequences, etc.), the player can be permitted to access a player's account. As one potential optional security feature, the wagering game machine 600 can be configured to permit a player to only access an account the player has specifically set up for the wagering game machine 600. Other conventional security features can also be utilized to, for example, prevent unauthorized access to a player's account, to minimize an impact of any unauthorized access to a player's account, or to prevent unauthorized access to any personal information or funds temporarily stored on the wagering game machine 600.

The player-accessible value input device 618 can itself comprise or utilize a biometric player information reader which permits the player to access available funds on a player's account, either alone or in combination with another of the aforementioned player-accessible value input devices 618. In an embodiment wherein the player-accessible value input device 618 comprises a biometric player information reader, transactions such as an input of value to the wagering game machine 610, a transfer of value from one player account or source to an account associated with the wagering game machine 600, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 618 comprising a biometric player information reader can require a confirmatory entry from another biometric player information reader 652, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 618 can be provided remotely from the wagering game machine 610.

The player input device 624 may include a plurality of push buttons on a button panel for operating the wagering game machine 600. In addition, or alternatively, the player input device 624 can comprise a touch screen mounted to the primary display 614 and/or secondary display 616. In one aspect, the touch screen is matched to a display screen having one or more selectable touch keys 630 selectable by a user's touching of the associated area of the screen using a finger or a tool, such as a stylus pointer. A player enables a desired function either by touching the touch screen at an appropriate touch key 630 or by pressing an appropriate push button on the button panel. The touch keys 630 can be used to implement the same functions as push buttons. Alternatively, the push buttons 626 can provide inputs for one aspect of the operating the game, while the touch keys 630 can allow for input needed for another aspect of the game. The various components of the wagering game machine 600 can be connected directly to, or contained within, the casing 612, as seen in FIG. 6, or can be located outside the casing 612 and connected to the casing 612 via a variety of wired (tethered) or wireless connection methods. Thus, the wagering game machine 600 can comprise a single unit or a plurality of interconnected (e.g., wireless connections) parts which can be arranged to suit a player's preferences.

The operation of the basic wagering game on the wagering game machine 600 is displayed to the player on the primary display 614. The primary display 614 can also display a bonus game associated with the basic wagering game. The primary display 614 preferably takes the form of a high resolution LCD, a plasma display, an LED, or any other type of display suitable for use in the wagering game machine 600. The size of the primary display 614 can vary from, for example, about a 2-3" display to a 15" or 17" display. In at least some embodiments, the primary display 614 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 614 and/or secondary display 616 can have a 16:9 aspect ratio or other aspect ratio (e.g., 4:3). The primary display 614 and/or secondary display 616 can also each have different resolutions, different color schemes, and different aspect ratios. As discussed earlier, in some embodiments, either or both of primary display 616 and secondary display 614 may be a WOWvx display available from Koninklijke Philips Electronics N.V. However, the embodiments are not limited to a particular 3D display and other such 3D displays are available and within the scope of the inventive subject matter.

A player typically begins play of the basic wagering game on the wagering game machine 600 by making a wager (e.g., via the value input device 618 or an assignment of credits stored on the portable wagering game machine 600 via the touch screen keys 630, player input device 624, or buttons 626) on the wagering game machine 600. In some embodiments, the basic game can comprise a plurality of symbols arranged in an array, and includes at least one payline 632 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 618 of the wagering game machine 600 can double as a player information reader 652 that allows for identification of a player by reading a card with information indicating the player's identity (e.g., reading a player's credit card, player ID card, smart card, etc.). The player information reader 652 can alternatively or also comprise a bar code scanner, RFID transceiver or computer readable storage medium interface. In one embodiment, the player information reader 652 comprises a biometric sensing device.

In some embodiments, a portable wagering game machine 600 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

CONCLUSION

Systems and methods for presenting a wagering game that includes elements that are rendered in real 3D form in response to transition events have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A gaming system including a gaming machine, the system comprising:
   a three-dimensional (3D) display device capable of presenting a graphical object of a wagering game in a flat three-dimensional form and in a real three-dimensional form, wherein in the real 3D form the graphical object appears to a player to be in front of or behind a screen of the display device; and
   a hardware platform operative with software to present the graphical object of the wagering game on the display device, the software including a graphical subsystem having a standard graphics library and a real 3D graphics library, the software making a plurality of function calls when executed on the gaming machine, the plurality of function calls including a standard function call invoking a standard function in the standard graphics library and a real 3D function call invoking a real 3D function in the real 3D graphics library, the real 3D function determining whether the graphical object appears in front of or behind the screen of the display device and a depth of the graphical object relative to the screen.

2. The gaming system of claim 1, wherein the graphical object is associated with a flag such that the graphical object is rendered in the flat 3D form when the flag has a first state and is rendered in the real 3D form when the flag has a second state.

3. The gaming system of claim 1, further including a graphics processing unit for rendering the graphical object in real time in the real 3D form.

4. The gaming system of claim 3, wherein the graphics processing unit is external to the gaming machine.

5. The gaming system of claim 1, further including a value input device enabling a player to place a wager to play the wagering game.

6. A gaming machine comprising:
   a three-dimensional (3D) display device capable of presenting a graphical object of a wagering game in a flat three-dimensional form and in a real three-dimensional form, wherein in the real 3D form the graphical object appears to a player to be in front of or behind a screen of the display device; and
   a hardware platform operative with software to present the graphical object of the wagering game on the display device, the software including a graphical subsystem having a standard graphics library and a real 3D graphics library, the software making a plurality of function calls when executed on the gaming machine, the plurality of function calls including a standard function call invoking a standard function in the standard graphics library and a real 3D function call invoking a real 3D function in the real 3D graphics library, the real 3D function determining whether the graphical object appears in front of or behind the screen of the display device and a depth of the graphical object relative to the screen.

7. The gaming machine of claim 6, wherein the graphical object is associated with a flag such that the graphical object is rendered in the flat 3D form when the flag has a first state and is rendered in the real 3D form when the flag has a second state.

8. The gaming machine of claim 6, further including a graphics processing unit for rendering the graphical object in real time in the real 3D form.

9. The gaming machine of claim 8, wherein the graphics processing unit is external to the gaming machine.

10. The gaming machine of claim 6, further including a value input device enabling a player to place a wager to play the wagering game.

11. A method comprising:
  accepting, via a value input device, a physical item associated with a monetary value to fund a wager for playing a wagering game;
  rendering, by a rendering engine, a three-dimensional (3D) game world for a wagering game on a 3D display device;
  generating, by a processor, a random event in the wagering game and representing the random event with at least one graphical object in the 3D game world;
  in response to a software flag indicating that the graphical object is to be rendered in a flat 3D form, making a standard computer function call into a standard graphics library and rendering the graphical object in real time in the flat 3D form in the 3D game world;
  in response to the software flag indicating that the graphical object is to be rendered in the real 3D form, making a real 3D computer function call into a real 3D graphics library to determine a depth of the graphical object relative to the screen of the display device and whether the graphical object appears in front of or behind the screen and rendering the graphical object in real time in the real 3D form in the 3D game world; and
  providing, by the processor, an award for a winning outcome of the random event.

\* \* \* \* \*